United States Patent
Hosoda et al.

(10) Patent No.: US 9,340,352 B2
(45) Date of Patent: May 17, 2016

(54) WATER-SOLUBLE FILM ROLL AND METHOD FOR PAYING OUT WATER-SOLUBLE FILM

(75) Inventors: Naohiro Hosoda, Saijo (JP); Shintaro Hikasa, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 13/345,186

(22) Filed: Jan. 6, 2012

(65) Prior Publication Data

US 2012/0121808 A1 May 17, 2012

Related U.S. Application Data

(62) Division of application No. 11/720,146, filed as application No. PCT/JP2005/020358 on Nov. 7, 2005, now abandoned.

(30) Foreign Application Priority Data

Nov. 24, 2004 (JP) ................................. 2004-339083

(51) Int. Cl.
*B29D 22/00* (2006.01)
*B65D 85/672* (2006.01)
*C08J 5/18* (2006.01)

(52) U.S. Cl.
CPC ................. *B65D 85/672* (2013.01); *C08J 5/18* (2013.01); *C08J 2329/04* (2013.01); *Y10T 428/1379* (2015.01); *Y10T 428/31504* (2015.04)

(58) Field of Classification Search
USPC ...................... 428/36.6, 220, 411.1
See application file for complete search history.

(56) References Cited

U.S. PATENT DOCUMENTS

| 2,672,299 | A | | 3/1954 | Jones |
| 4,148,395 | A | * | 4/1979 | Syracuse et al. ............... 206/414 |
| 4,698,292 | A | | 10/1987 | Hilger et al. |
| 4,994,013 | A | | 2/1991 | Suthanthiran et al. |
| 2004/0114240 | A1 | | 6/2004 | Niki et al. |
| 2004/0170826 | A1 | | 9/2004 | Shibano et al. |

FOREIGN PATENT DOCUMENTS

| JP | 51-38279 | 10/1976 |
| JP | 54-33115 | 3/1979 |
| JP | 57-194972 | 11/1982 |

(Continued)

OTHER PUBLICATIONS

International Search in International Application No. PCT/JP2005/020358 dated Feb. 14, 2006.

(Continued)

*Primary Examiner* — Sang Kim
(74) *Attorney, Agent, or Firm* — Oblon, McClelland, Maier & Neustadt, L.L.P.

(57) ABSTRACT

To provide a water-soluble film roll 3 having end faces 4 with masking materials 5 adhered thereto. By using the water-soluble film roll 3 and paying out a water-soluble film 1 while holding the masking materials 5 adhered to the end faces 4, it is possible to prevent moisture from adhering to the end faces 4 and to prevent the water-soluble film 1 from rupturing due to welding of the film 1 with itself. In this connection, the masking materials 5 are preferably a plastic film capable of being adhered to the end faces 4 with a pressure-sensitive adhesive.

21 Claims, 1 Drawing Sheet

(56) References Cited

FOREIGN PATENT DOCUMENTS

| | | |
|---|---|---|
| JP | 03-140384 | 6/1991 |
| JP | 2001-125227 | 5/2001 |
| JP | 2001-188319 | 7/2001 |
| JP | 2001-315885 | 11/2001 |
| JP | 2001-315886 | 11/2001 |
| JP | 2004-203430 | 7/2004 |
| JP | 2004-276237 | 10/2004 |

OTHER PUBLICATIONS

European Supplementary Search Report in European Application No. EP05800369 dated May 15, 2009.
Notification of Reasons for Refusal mailed May 25, 2010 (w/English Translation).
Certified English Translation of Notification of Reasons for Refusal mailed Feb. 1, 2011.
Certified English Translation of Notification of Reasons for Refusal mailed Sep. 2, 2011.

* cited by examiner

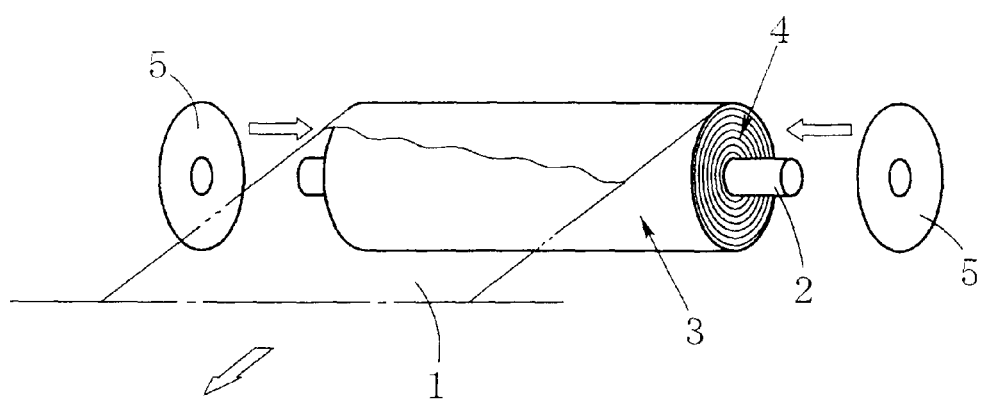

WATER-SOLUBLE FILM ROLL AND METHOD FOR PAYING OUT WATER-SOLUBLE FILM

This application is a Divisional of U.S. application Ser. No. 11/720,146, filed on May 24, 2007, which is a National Stage of PCT/JP05/20358 filed on Nov. 7, 2005.

TECHNICAL FIELD

The present invention relates to a water-soluble film roll, and particularly to a water-soluble film roll having end faces with masking materials adhered thereto. The invention also relates to a method for paying out a water-soluble film from the water-soluble film roll.

BACKGROUND ART

Water-soluble films made of polyvinyl alcohol or the like are used for various applications. Examples of such films include hydraulic transfer base films which are to be used for hydraulic transfer method. The hydraulic transfer method is a process in which a printed film for hydraulic transfer, which includes a water-soluble hydraulic transfer base film having on a surface thereof a print layer to be transferred, is floated on the surface of water with its print side up and then various types of shaped articles, which are transfer receptors, are pushed downward into the printed film; thereby the print layer is transferred to the transfer receptors due to hydraulic pressure (see, for example, patent reference 1). Using the hydraulic transfer method, it is possible to impart design to the surface of a shaped article having an uneven three-dimensional surface or a curved surface or to form a print layer for the purpose of improving surface properties.

In many cases, a water-soluble film produced is wound up into a roll to form a water-soluble film roll. The water-soluble film roll is packed up and then transported to a secondary-processing manufacturer or the like. The water-soluble film roll, which has been unpacked there, is then installed to a paying out machine and is subjected to secondary processing, such as printing.

In application of secondary processing, particularly of high-speed printing, occurrence of film rupture during the paying out of a film from a roll thereof has become a problem. In a processing line of a continuous system, production loss is caused mainly by rupture of a film because it takes a long time to reintroduce a film to a processing machine. Rupture of a film may occur throughout a year, but it occurs particularly frequently in winter.

It has heretofore been believed that occurrence of film rupture is greatly influenced by moisture. Therefore, approaches of packing or wrapping of water-soluble film rolls sufficiently have been adopted. In many cases, however, it is impossible to avoid occurrence of rupture of a film during the paying out thereof no matter how the packing or wrapping thereof is sufficient.

Meanwhile, it has been believed that the reason why rupture of a film occurs particularly frequently in winter is that tear strength of a film decreases when the temperature of the film is low. Therefore, a countermeasure is taken which includes use, in winter, of a water-soluble film softened through adjustment of the composition of the base resin of the film. Nobody, however, has exterminated rupture of films.

Patent Document 1: JP 54-33115 A

DISCLOSURE OF THE INVENTION

Problems to be Solved by the Invention

The present invention was made in order to solve the problems mentioned above. An object of the present invention is to provide a water-soluble film roll which can prevent a film from rupturing when the film is paid out from the roll. Another object is to provide a method for paying out a water-soluble film by which the film is prevented from rupturing.

Means for Solving the Problems

As a result of intensive researches on techniques for attaining the above-mentioned objects, the present inventors found that rupture of a water-soluble film during the paying out of its roll is caused by permeation of moisture from the end faces of the roll and that the above-mentioned problem can be solved by provision of a water-soluble film roll in which a masking material is adhered to an end faces of the water-soluble film roll.

Under some circumstances where a water-soluble film roll is placed in, for example, its unpackaging, moisture may adhere to the surface of the roll. For example, dew condensation may occur on the surface of a roll, or mist-like waterdrops floating in the air may adhere to the surface of a roll. Dew condensation tends to occur when the temperature of the surface of a roll is lower than the indoor temperature, for example, when a cooled water-soluble film roll is carried into a warm room. The adhering of mist-like waterdrops tends to occur in rooms humidified with a humidifier or the like. When humidification is performed with a humidifier or the like, mist-like waterdrops are formed through condensation of the steam released from the humidifier due to the temperature distribution in the room. The waterdrops move along the air flow and adhere to a roll. Alternatively, mist-like waterdrops directly released from a humidifier or the like adhere to a roll.

Thus, once moisture adheres to the surface of a water-soluble film roll, especially an end face of the roll, the moisture permeates from the end portion of the roll and immediately spreads into a gap of the water-soluble film. The moisture swells and dissolves the surface of the film and simultaneously further permeates into the inside of the film and is dried again. Thus, local welding is caused between portions of the water-soluble film in contact. It was found that such welding of a film itself causes rupture of the film during the paying out of the film from a roll thereof. A conceivable reason why such rupture of a film occurs particularly frequently in winter is not only that the tear strength of a film decreases, but also that the temperature of the surface of a roll drops during transportation or the like and, therefore, dew condensation readily occurs or that the inside of a room is often humidified.

Even when the packing or wrapping of a roll is sufficient, it is a common knowledge that the roll is loaded to a paying-out machine after being unpackaged or unwrapped. Generally, it takes several tens of minutes or more from the completion of the loading to a paying-out machine to the completion of the paying out. However, once moisture adheres to an end face of the roll during that time, the film will result in welding in a short time after the adhesion of the moisture while depending on the kind of the film and conditions such as temperature and humidity. As mentioned above, welding of a film can occur even during the paying out of the film. Thus, finding that it is necessary to prevent moisture permeation even during paying out resulted in the present invention.

It is desirable that the water-soluble film is a polyvinyl alcohol film. It is desirable that the water-soluble film has a thickness of 10 to 200 μm, that the water-soluble film has a water content of 1 to 6% by weight, and that the water-soluble film has a Young's modulus of 50 to 500 MPa. It is desirable that the masking material is adhered with a pressure-sensitive adhesive. In this connection, it is more desirable that the pressure-sensitive adhesive has an adhesion of 0.01 to 5 N/cm. It is also desirable that the masking material is composed of a plastic film. It is also desirable that the water-soluble film is a hydraulic transfer base film. Moreover, a package comprising the aforementioned water-soluble film roll in a moisture-proof package is also preferable.

One preferred embodiment is a method for paying out a water-soluble film, the method comprising paying out a water-soluble film from a water-soluble film roll while holding the masking material is held adhered to the end face of the water-soluble film roll. In this connection, it is desirable that the paying out speed is 1 to 100 m/min. Another preferred embodiment is a method for producing a printed film, the method comprising applying print to a water-soluble film while paying out the water-soluble film by the method mentioned above.

Effect of the Invention

Use of the water-soluble film roll of the present invention makes it possible to prevent moisture from permeating from the end faces of the water-soluble film roll. As a result, it is possible to effectively prevent a water-soluble film from rupture thereof which occurs in the course of the paying out of the water-soluble film from a water-soluble film roll, regardless of the circumstance where the water-soluble film roll is placed. Particular suitability is found in the case where the water-soluble film is a hydraulic transfer base film.

BRIEF DESCRIPTION OF THE DRAWING

FIG. 1 is a diagram showing the water-soluble film roll of Example 1.

EXPLANATION OF REFERENCE NUMERALS

1 Water-soluble film
2 Paper tube
3 Water-soluble film roll
4 End face
5 Masking material

BEST MODE FOR CARRYING OUT THE INVENTION

The water-soluble film roll of the present invention is a water-soluble film roll wherein a masking material is adhered to an end face of the roll of a water-soluble film.

The water-soluble film mentioned above is not particularly restricted as long as it is water-soluble and examples thereof include water-soluble films of one resin or two or more resins selected from polyvinyl alcohol, carboxymethylcellulose, hydroxyethylcellulose, polyvinylpyrrolidone, polyacrylic acid and salts thereof, starch, glycerol, gelatin, and the like. In particular, water-soluble films made of polyvinyl alcohol are preferably used because it is possible to control mechanical strength required and moisture resistance during handling by changing various conditions such as degree of polymerization and degree of saponification of polyvinyl alcohol, incorporation of additives such as starch. Water-soluble films made of polyvinyl alcohol are of good printability. In addition, the speed of softening due to water absorption after being floated on water, the time necessary for spreading or diffusing and the easiness of deformation during transfer can be controlled. Therefore, they are suitably used as hydraulic transfer base films. The higher the water solubility of the aforesaid water-soluble film, the more noticeably the effect of the present invention is exhibited.

It is desirable that the thickness of the aforesaid water-soluble film is from 10 to 200 μm. When the thickness is less than 10 μm, the film is lacking in strength and, therefore, the process passability of the water-soluble film in its secondary processing may be deteriorated. The thickness is more preferably 20 μm or more, and even more preferably 25 μm or more. When the thickness is over 200 μm, the water-soluble film becomes more resistant to rupture due to increase in strength of the film and, therefore, the necessity for adopting the constitution of the present invention decreases. In use as a hydraulic transfer base film, the solubility in water decreases and, as a result, the production efficiency by the hydraulic transfer method may be reduced. The thickness is more preferably 100 μm or less, and even more preferably 40 μm or less.

It is desirable that the water content of the aforesaid water-soluble film is from 1 to 6% by weight. When the water content is less than 1% by weight, not only the film tends to rupture due to reduction in its impact resistance, but also the film tends to have static electricity and, therefore, dust or dirt may adhere to the film. As a result, for example, when printing is applied to the film, print omission may occur. The water content is more preferably 1.5% by weight or more, and even more preferably 2% by weight or more. When over 6% by weight, the film may be stretched during paying out of the film from a water-soluble film roll. As a result, when printing is applied to the film, print patterns may lose sharpness, or when multicolor printing is applied, print shift may occur. The water content is more preferably 4% by weight or less.

It is desirable that the Young's modulus of the aforesaid water-soluble film is from 50 to 500 MPa. The Young's modulus of a water-soluble film as used herein means a Young's modulus of the film in the winding-up direction (MD) thereof measured by the method described below. When the Young's modulus is less than 50 MPa, the impact resistance is high and the film is resistant to rupture during its paying out even when welding of the film occurs and, therefore, the necessity for adopting the constitution of the present invention may decrease. When a water-soluble film is paid out, the film may be stretched in its longitudinal direction and, therefore, print patterns may lose sharpness when printing is applied. The Young's modulus is more preferably 100 MPa or more. On the other hand, when the Young's modulus is over 500 MPa, the impact resistance decreases and the film tends to rupture. The Young's modulus is more preferably 300 MPa or less. In the measurement of the Young's modulus, a sample film having been cut into a strip form of 15 mm in width and 150 mm in length was humidity controlled under conditions of 20° C. and 65% RH for 3 hours and then stretched with an Autograph (manufactured by Shimadzu Corp.) at a chuck distance of 100 mm and a tension rate of 100 mm/min. Then, an elastic modulus was calculated from the load at an elongation of 2%.

The aforesaid water-soluble film is wound into the form of a roll and results in a water-soluble film roll. The water-soluble film roll may either be wound around a core or be directly wound without using a core. In consideration of the workability of paying out the film, it is preferable that the water-soluble film roll is wound around a core. In this connection, it is more preferable that the water-soluble film roll is wound around a cylindrical core. The material of the core is not particularly restricted, but paper, plastic, and the like are typically used. There are no particular restrictions in length and width of the water-soluble film. Films with a length of from about 1 to about 3000 m and a width of from about 0.5 to about 4 m are preferably used.

On an end face of the water-soluble film roll of the present invention, a masking material must be adhered. If the masking material is only in contact with the end face, water permeates through a small gap between the end face of the roll and the masking material during paying out of the film, resulting in rupture of the film. When the masking material is adhered to the end face and rotates as a unit together with the roll, the permeation of moisture is prevented completely. The method by which the masking material is adhered is not particularly restricted, but it is preferably adhered with a pressure-sensitive adhesive. For example, a masking material having a pressure-sensitive adhesive layer is suitably used.

The pressure-sensitive adhesive as referred to herein is a substance which can be adhered to an object by pressing. Pressure-sensitive adhesives which can be used are not particularly restricted and examples thereof include rubber-based pressure-sensitive adhesives, acryl-based pressure-sensitive adhesives and ethylene vinyl acetate (EVA)-based pressure-sensitive adhesives. The aforesaid pressure-sensitive adhesive is preferably non-solvent type one because it is desirable that components of a pressure-sensitive adhesive is difficult to migrate to a water-soluble film even in close contact for a long period of time. It is desirable that the pressure-sensitive adhesive have an adhesion of from 0.01 to 5 N/cm. The adhesion of a pressure-sensitive adhesive as referred to herein is an adhesion measured in accordance with JIS 20237. When the adhesion was 0.1 N/cm or more, a stainless steel plate was used as a test plate to which a masking material is adhered. When the adhesion was less than 0.1 N/cm, an acrylic resin (PMMA) plate was used as a test plate to which a masking material is adhered.

The adhesion of the pressure-sensitive adhesive is preferably 0.01 N/cm or more, and more preferably 0.1 N/cm or more because a masking material is required to remain adhered on an end face of a water-soluble film roll without being detached even during the paying out of a water-soluble film from the water-soluble film roll. On the other hand, when the adhesion of the pressure-sensitive adhesive is too high, the end face of the water-soluble film roll may get coarse or some portion of the adhesive may stay on the end face, or the water-soluble film may rupture due to adhesion resistance with the pressure-sensitive adhesive. From this point of view, the adhesion of the pressure-sensitive adhesive is preferably 5 N/cm or less, and more preferably 2 N/cm or less. Therefore, from the viewpoint of preventing these problems, the pressure-sensitive adhesive is desirably one having not too high an adhesion. It is also desirable that the pressure-sensitive adhesive has removability. Synthetic rubber-based or ethylene-vinyl acetate-based pressure-sensitive adhesives are more suitably used because they are of non-solvent type and also because it is easy to select one having a proper adhesion. Plastic films of resin having pressure-sensitive adhesiveness are also used.

While the above-mentioned masking material is normally composed of plastic film, paper, plate, nonwoven fabric, woven fabric or knit, it is not particularly restricted. From the viewpoint of effective prevention of moisture permeation, the masking material is preferred to be of flexibility sufficient for following unevenness of an end face of a water-soluble film roll and to be water-impermeable. For this reason, the masking material is preferably made of plastic film. While examples of such plastic film include films of polyester, polyolefin, polyvinyl chloride, cellophane or acetate, films of polyolefin are preferably used from the flexibility point of view.

A package including the aforementioned water-soluble film roll in a moisture-proof package is a preferred embodiment. Many water-soluble films are highly hygroscopic. Therefore, when a water-soluble film roll is allowed to stand for a long period of time while being unpackaged, the film may absorb moisture in the air, and surface film and film located at the ends of the roll may stretch to form wrinkles or slack. It is possible to prevent these problems by packaging a water-soluble film roll in a moisture-proof package.

While the method of moisture-proof packaging is not particularly restricted, it is preferable to cover a water-soluble film roll with a moisture-proof film such as aluminum deposit film. It may, if needed, be covered further with kraft paper or the like. In order to prevent a roll from being damaged due to shocks during transportation, it is desirable to mount hanging holders to both ends of the core of the roll and package the roll while hanging it.

Examples of the application of the water-soluble film include unit packaging materials for packaging a unit amount of agricultural chemicals, detergents, paints, and the like, remoistening adhesives, temporary supports such as embroidery bases or wig bases, agricultural seed tapes and seed cultivation sheets, laundry bags, textile packaging materials and hydraulic transfer base films. Among these, hydraulic transfer base films are preferred. Use of the present invention is greatly beneficial for hydraulic transfer base films because such films are often paid out continuously at a high speed for a long period of time when printing is applied thereto and, therefore, rupture of a film due to welding easily occur.

A method for paying out a water-soluble film wherein a water-soluble film is paid out from the aforesaid water-soluble film roll while the masking materials are held adhered to the end faces of the water-soluble film roll is a preferable embodiment of the present invention. By paying out a water-soluble film in such a state, it is possible to prevent the water-soluble film from welding caused by permeation of moisture from the end faces of the water-soluble film roll even during the paying out of the roll. As a result, rupture of the water-soluble film can be prevented effectively.

In this connection, it is desirable that the paying out speed of a water-soluble film is from 1 to 100 m/min. When it is 1 m/min or less, the production efficiency in secondary processing decreases, and in addition, the need for adopting the constitution of the present invention is reduced because rupture of a water-soluble film due to welding rarely occurs. The paying out speed is more preferably 10 m/min or more, and even more preferably 20 m/min or more. When the speed is over 100 m/min, rupture of a film will occur easily. Moreover, the quality may not be sufficiently maintained when a film is printed. The paying out speed is more preferably 80 m/min or less, and even more preferably 60 m/min or less.

While the masking materials are required to be kept adhered to the end faces of the water-soluble film roll during the paying out of the water-soluble film from the water-soluble film roll, the timing when the masking materials are adhered to the end faces is not particularly restricted. For example, it may be adhered immediately after a water-soluble film roll is produced. Alternatively, it may also be adhered after a water-soluble film roll is taken out from a moisture-proof package. In order to prevent rupture of a water-soluble film effectively, it is desirable to adhere so that the period of time when the end faces of a water-soluble film roll are left exposed may become as short as possible.

A method for producing a printed film in which printing is applied to a water-soluble film while the water-soluble film is paid out by the aforementioned method for paying out a water-soluble film is also a preferred embodiment. During the production of a printed film, a water-soluble film is often required to be paid out continuously at a high speed for a long period of time and rupture caused by welding of the water-soluble film tends to occur. Therefore, the benefit from the adoption of the paying out method described above is great. The printing to a water-soluble film is performed by a conventional method. For example, gravure printing, screen printing, offset printing, roll coating, and the like are adopted. A method in which printing is applied directly to a water-soluble film and a method in which printing is applied to another film temporarily and then transferred to a water-soluble film are available. The ink used for the printing is not particularly restricted and conventional inks may be used.

The printed film prepared by the production method described above can be used suitably in a hydraulic transfer method as a printed film for hydraulic transfer in which a print layer has been formed on a water-soluble film. Print layers on water-soluble films are normally water-insoluble and, end portions of a film where no print layer has been formed are often cut away after printing. In many cases, therefore, at end portions of a roll of a wound printed film for hydraulic transfer, a water-soluble film is not in direct contact with itself. For this reason, when a printed film for hydraulic transfer is paid out again from such a roll, the film will hardly be welded with itself. Therefore, it becomes unnecessary to provide a roll of a printed film for hydraulic transfer with masking materials for preventing rupture of the film.

The above-mentioned printed film for hydraulic transfer is used for forming a print layer on the surfaces of various shaped articles and the like. The surfaces of the shaped articles and the like may be flat, rough or uneven. The film can suitably be used mainly for forming a print layer on the surface of a shaped article having an uneven three-dimensional surface or a curved surface.

EXAMPLES

The present invention is described concretely below with reference to Examples. It is noted that each of the water-soluble film rolls used in Examples was stored in a moisture-proof package at room temperature, 20 to 25° C., until immediately before a masking material was adhered to an end face of a roll.

Example 1

As shown in FIG. 1, to each of both end faces 4 of a water-soluble film roll 3 prepared by winding up a polyvinyl alcohol film (VF-H Series manufactured by Kuraray Co., Ltd., thickness: 30 μm, width: 300 mm, length: 1000 m, water content: 2.8%, Young's modulus: 200 MPa), which is a water-soluble film 1, around a paper tube 2 (paper cylinder with an inner diameter of 75 mm and an outer diameter of 90 mm), a "protect tape #6314-B" (polyolefin film having a special synthetic rubber-based pressure-sensitive adhesive layer on one side; overall thickness: 60 μm, adhesion: 0.9 N/cm) manufactured by Sekisui Chemical Co., Ltd., which had been cut into a doughnut shape in conformity with the outer diameter of the paper tube 2 and the winding diameter of the water-soluble film roll 3, as a masking material 5, was adhered with avoidance of air bubble formation. In a room humidification-conditioned to a temperature of 20° C. and a relative humidity of 60% from the outdoor conditions, i.e. a temperature of 10° C. and a relative humidity of 50%, the water-soluble film roll 3 was loaded into a paying-out machine. The polyvinyl alcohol film was then continuously paid out from the water-soluble film roll 3 at a rate of 30 m/min and printing was applied to one side of the water-soluble film 1. In this operation, the generation of peeling sound of the polyvinyl alcohol film at the end portions of the water-soluble film roll 3 was checked and the number of ruptures of the polyvinyl alcohol film was counted. When this evaluation procedure was repeated for five rolls, none of the five rolls generated peeling sound or rupture. The results are summarized in Table 1.

Example 2

Operations the same as those in Example 1 were repeated except using, as masking materials 5, "protect tape #622-B" (polyolefin film having an ethylene vinyl acetate (EVA)-based pressure-sensitive adhesive layer on one side; overall thickness: 55 μm, adhesion: 0.02 N/cm) manufactured by Sekisui Chemical Co., Ltd., which had been cut into a doughnut shape in conformity with the outer diameter of the paper tube 2 and the winding diameter of the water-soluble film roll 3. In this operation, the generation of peeling sound of the polyvinyl alcohol film at the end portions of the water-soluble film roll 3 was checked and the number of ruptures of the polyvinyl alcohol film was counted. When this evaluation procedure was repeated for five rolls, no peeling sound and no rupture were generated in three rolls. In two rolls, however, the polyvinyl alcohol films peeled off partly from the end faces 4 of the rolls and came to produce peeling sound during the paying out of the films. In addition, each film ruptured only once. Therefore, the number of ruptures was 0.4 times per roll in average. The results are summarized in Table 1.

Example 3

Operations the same as those in Example 1 were repeated except using, as masking materials 5, "Elep masking tape N-300" (polyester film having an acryl-based pressure-sensitive adhesive layer on one side; overall thickness: 100 μm, adhesion: 2.8 N/cm) manufactured by Nitto Denko Corp. In this operation, the generation of peeling sound of the polyvinyl alcohol film at the end portions of the water-soluble film roll 3 was checked and the number of ruptures of the polyvinyl alcohol film was counted. The results of evaluations for only one roll are summarized in Table 1.

Comparative Example 1

Operations the same as those of Example 1 were repeated except using no masking material 5. In this operation, the generation of peeling sound of the polyvinyl alcohol film at the end portions of the water-soluble film roll 3 was checked and the number of ruptures of the polyvinyl alcohol film was counted. The results of evaluations for only one roll are summarized in Table 1.

Comparative Example 2

Operations the same as those of Example 1 were repeated except using corrugated cardboards (thickness: 2 mm) as masking materials 5 and bringing them into close contact with the end faces 4 of a roll without using pressure-sensitive adhesive. In this operation, the generation of peeling sound of the polyvinyl alcohol film at the end portions of the water-soluble film roll 3 was checked and the number of ruptures of the polyvinyl alcohol film was counted. The results of evaluations for only one roll are summarized in Table 1.

TABLE 1

| | Constitution of masking material | Adhesion (N/cm) | Generation of peeling sound | Number of ruptures (time) |
|---|---|---|---|---|
| Example 1 | Polyolefin film having a special synthetic rubber-based pressure-sensitive adhesive layer on one side | 0.9 | No | 0 |
| Example 2 | Polyolefin film having an EVA-based pressure-sensitive adhesive layer on one side | 0.02 | Yes/No *1) | 0.4 |
| Example 3 | Polyester film having an acryl-based pressure-sensitive adhesive layer on one side | 2.8 | Yes | 0 |
| Comparative Example 1 | None | — | Yes | 10 |
| Comparative Example 2 | Corrugated cardboard | — | Yes | 2 |

*1) Peeling sounds were generated in two of the five rolls.

As shown in Table 1, when masking materials 5 with an adhesion of 0.9 N/cm were adhered to end faces 4 of a water-soluble film roll 3 (Example 1), no peeling sounds were generated and no rupture of a polyvinyl alcohol film occurred in all of the five rolls tested. When low-bonding masking materials 5 with an adhesion of 0.02 N/cm were adhered to end faces 4 of a water-soluble film roll 3 (Example 2), in two of the five rolls tested, a peeling sound was generated and rupture occurred only once in each roll. In the remaining three rolls, however, no peeling sound was generated and no rupture occurred. When high-bonding masking materials 5 with an adhesion of 2.8 N/cm were adhered to end faces 4 of a water-soluble film roll 3 (Example 3), peeling sounds were generated, but no rupture of a polyvinyl alcohol film occurred. The peeling sounds seem to be sounds generated when the polyvinyl alcohol film and the adhesive on the masking materials 5 peel off from each other. When no masking material 5 was used (Comparative Example 1), peeling sounds due to welding of the polyvinyl alcohol film were generated and rupture of the polyvinyl alcohol film frequently occurred. When corrugated cardboards were used as masking materials 5 and they were brought into close contact with end faces 4 of a water-soluble film roll 3 (Comparative Example 2), many peeling sounds due to welding of the polyvinyl alcohol film were generated in an early stage of the paying out, and rupture of the polyvinyl alcohol film occurred at the outer peripheral portions of the water-soluble film roll 3. It is assumed that permeation of moisture was not prevented at the outer peripheral portions of the end faces 4 of the water-soluble film roll 3, leading to welding of the polyvinyl alcohol film and resulting in occurrence of the rupture.

The invention claimed is:

1. A method for paying out a water-soluble polyvinyl alcohol film, comprising paying out the water-soluble polyvinyl alcohol film from a roll of the water-soluble polyvinyl alcohol film while a masking material is adhered to an end face of the roll of the water-soluble polyvinyl alcohol film, wherein
   the masking material prevents moisture from permeating the end face of the roll of the water-soluble polyvinyl alcohol film and reduces the amount of rupture of the water-soluble polyvinyl alcohol film during the paying out,
   the masking material is adhered to an end face of the roll of the water-soluble polyvinyl alcohol film with a pressure-sensitive adhesive,
   the pressure-sensitive adhesive has an adhesion of 0.01 to 5 N/cm, and
   the paying out speed is 1 to 100 m/min.

2. The method according to claim 1, wherein the pressure-sensitive adhesive has an adhesion of 0.01 to 2 N/cm.

3. The method according to claim 1, wherein the paying out speed is 1 to 80 m/min.

4. The method according to claim 1, wherein the paying out speed is 1 to 60 m/min.

5. The method according to claim 1, wherein the water-soluble polyvinyl alcohol film has a thickness of 10 to 200 µm.

6. The method according to claim 1, wherein the water-soluble polyvinyl alcohol film has a water content of 1 to 6% by weight.

7. The method according to claim 1, wherein the water-soluble polyvinyl alcohol film has a Young's modulus of 50 to 500 MPa.

8. The method according to claim 1, wherein the masking material is composed of a plastic film.

9. The method according to claim 1, wherein the water-soluble polyvinyl alcohol film is a hydraulic transfer base film.

10. The method according to claim 1, wherein the roll comprises the water-soluble polyvinyl alcohol film wound around a core.

11. The method according to claim 1, wherein the masking material is composed of plastic film, paper, plate, nonwoven fabric, woven fabric or knit.

12. The method according to claim 1, wherein the masking material consists of a plastic film.

13. The method according to claim 1, wherein the masking material is composed of a film of polyester, polyolefin, polyvinyl chloride, cellophane or acetate.

14. The method according to claim 1, wherein the masking material is composed of a film of polyolefin.

15. The method according to claim 1, wherein the masking material eliminates rupture of the water-soluble polyvinyl alcohol film during the paying out.

16. The method according to claim 1, wherein the masking material is adhered to each end face of the roll of the water-soluble polyvinyl alcohol film.

17. The method according to claim 1, wherein the water-soluble polyvinyl alcohol film is a single layer film.

18. The method according to claim 1, wherein a wound film of the roll consists essentially of the water-soluble polyvinyl alcohol film.

19. The method according to claim 1, wherein a wound film of the roll consists of the water-soluble polyvinyl alcohol film.

20. The method according to claim 1, wherein a wound film of the roll consists essentially of the water-soluble polyvinyl alcohol film and wherein the water-soluble polyvinyl alcohol film is a single layer film.

21. A method for producing a printed film, the method comprising applying print to the water-soluble film while paying out the water-soluble film by the method according to claim 1.

* * * * *